United States Patent
Parker

[15] 3,667,546
[45] June 6, 1972

[54] WATERFLOODING METHOD

[72] Inventor: Harry W. Parker, Lubbock, Tex.

[73] Assignee: Phillips Petroleum Company

[22] Filed: May 28, 1970

[21] Appl. No.: 41,543

[52] U.S. Cl. .................................................. 166/274, 166/275
[51] Int. Cl. ........................................................... E21b 43/22
[58] Field of Search ....................... 166/275, 274, 273, 305; 252/8.55 D

[56] References Cited

UNITED STATES PATENTS

| | | | |
|---|---|---|---|
| 3,402,137 | 9/1968 | Fischer et al. | 166/275 UX |
| 3,467,187 | 9/1969 | Gogarty et al. | 166/273 |
| 2,341,500 | 2/1944 | Detling | 166/274 UX |
| 3,323,589 | 6/1967 | Harvey | 166/274 |
| 3,051,234 | 8/1962 | Kyte | 166/275 |
| 2,827,964 | 3/1958 | Sandiford et al. | 166/275 X |
| 3,370,649 | 2/1968 | Wogelmuth | 166/274 |
| 3,148,730 | 9/1964 | Holbert | 166/274 |
| 3,396,790 | 8/1968 | Eaton | 166/270 |
| 3,308,883 | 3/1967 | Foster | 166/275 |

*Primary Examiner*—Stephen J. Novosad
*Attorney*—Young and Quigg

[57] ABSTRACT

A method of waterflooding a formation with a flood water and surfactant mixture whereby gel particles are added to the injection mixture to improve the efficiency of the flood.

9 Claims, No Drawings

WATERFLOODING METHOD

This invention relates to a method for waterflooding subterranean hydrocarbon-containing formation. In another aspect, this invention relates to a method of partially plugging portions of a formation with gel particles to improve the efficiency of waterflooding a hydrocarbon-containing formation.

In heretofore utilized water floods, as known in the art, surfactants and additives were sometimes incorporated in a flooding fluid to assist in scrubbing and removing the oil from the formation. These surfactants generally function to wet the surfaces of the hydrocarbon-containing formation and thereby lower the forces holding the hydrocarbon particles to and within the formation. Flooding water can then more uniformly and efficiently remove the in-place hydrocarbons. These surfactants are relatively expensive and for this reason it is desirable to remove the hydrocarbons from the formation with the utilization of a minimum amount of surfactant. By so lowering the amount of surfactant used during the flooding life of the reservoir, the storage equipment and labor requirements are also reduced.

It is, therefore, an object of this invention to provide an improved method of water flooding a hydrocarbon-containing formation. Another object of this invention is to provide a waterflooding method which has increased efficiency and reduced surfactant requirements. Yet another object of this invention is to provide a waterflooding method whereby the injection well has an improved injectivity profile.

Other aspects, objects, and advantages of the present invention will become apparent from a study of the disclosure and the appended claims.

In the operation of this invention, at least one injection well and at least one remotely located producing well extend from the surface of the earth into a subterranean hydrocarbon-containing formation that is desired to be produced by waterflooding techniques known in the art. It should be understood that this invention can be practiced where a plurality of producing and injection wells are utilized to flood a common hydrocarbon-containing formation. The relative placements of the producing wells are remote from any injection well and can be in various patterns such as 5-spot, 7-spot, etc., as known in the art. Flood water is injected downwardly through the injection wells and through the hydrocarbon-containing formation thereby forcing the hydrocarbons into the remote producing wells where they are produced to the surface and captured.

In order to more efficiently recover hydrocarbons from the formation, surfactants, as known in the art, are mixed with flood water. These surfactants can be, for example, of types and relative volumes as follows:

| Surfactant | Lbs/bbl Flood Water |
| --- | --- |
| Igepal CO–610 | 0.35–3.5 |
| Igepal CO–530 | 0.35–3.5 |
| Brij 30 | 0.35–3.5 |
| Brij 52 | 0.35–3.5 |
| Siponic L–4 | 0.35–3.5 |
| Triton N–57 | 0.35–3.5 |

Igepal CO–610 and Igepal CO–530 are manufactured by GAF Corp., 140 West 51st Street, New York, N.Y. 10020. Igepal CO–610 is a nonylphenoxy poly(ethyleneoxy) ethanol and Igepal CO–530 is a nonylphenoxypoly(ethyleneoxy) ethanol.

Brij 30 and Brij 52 are manufactured by Atlas Chemical Industries, New Murphy Road and Concord Pike, Wilmington, Del., 19899. Brij 30 is a polyoxyethylene (4) lauryl ether and Brij 52 is a polyoxyethylene (2) cetyl ether.

Siponic L–4 is manufactured by Alcolac Chemical Corp., 3436 Fairfield Road, Baltimore, Md. 21226. Siponic L–4 is an ethoxylated lauryl alcohol.

Triton N–57 is manufactured by Rohm and Haas Co., Independence Mall West, Philadelphia, Pa. 19105. Triton N–57 is a nonylphenoxylpolyethoxy ethanol.

These mixtures of surfactant and flood water are injected downwardly through the injection well and into the hydrocarbon-containing formation. At least a portion of this flood water and surfactant mixture to be injected is mixed with a volume of gel particles and the resultant slug of material is preferably intermittently injected into the formation. It should be understood, however, that the gel particles can be injected continuously, substantially continuously, or at various regular or irregular intervals.

The volume of gel material to be injected and mode of injection is generally selected after a study of the properties of the hydrocarbon-containing formation. Hydrocarbon sample analysis and formation core analysis, as known in the art, produce valuable data for selecting the volumes of gel and surfactant to be injected into that particular formation.

Where a formation has zones of high permeability relative to other zones of that formation, the gel particles selected for this invention should have a diameter larger than the diameter of the largest pores of the higher permeability zones. By so choosing the gel relative to the general pore diameter of the most permeable zone of the subject hydrocarbon-containing formation, said most permeable zone is partially plugged with the gel particles and subsequently injected fluids are thereby forced to flow through other portions of the formation that are less permeable. If these higher permeable zones are not plugged, oil is bypassed in the formation by the continued flowing of the injected fluid through the most permeable zones.

The volume of gel injected into the formation depends upon the formation properties. This volume of the gel that is selected for injection should be an amount at least sufficient to cause a change in the injectivity profile of the injection well. It is known in the art that the injectivity profile is the rate of fluid injection at a common pressure at each separate unit thickness of the hydrocarbon-containing formation. A change of this injectivity profile thereby indicates a plugging of the most permeable zones by the gel particles with subsequent improved flooding efficiency. It is preferred for greater hydrocarbon recovery efficiency that the volume of gel particles injected be an amount sufficient to cause the injectivity profile of the injection well to be substantially uniform over the portions of the formation through which fluid is flowing. In this mode, portions of the highly permeable zones are plugged and not taking fluid, but the less permeable zones are taking fluid at a uniform rate adjacent the well bore thereby causing the fluid to initially be evenly distributed through portions of the formation thickness. The volume of gel should not, however, be so large as to substantially plug pores to so large an extent that passing of fluid through the formation is substantially totally restricted.

The strength of the gel is also a factor to consider in selecting the gel particles to be utilized. It is recommended that the gel strength be sufficiently low so as to shear, on the spaces of the formation desired to be plugged, at a pressure below the formation fracturing pressure of said formation. By so selecting the gel, the injectivity profile can be changed by increasing the injection pressure and shearing a portion of the particles from their plugging position within the formation. Knowledge of the shear force required when a selected gel is in its plugging position can also be utilized for selective plugging of the formation and other alterations of fluid injectivity. The plugging properties of the gel material selected should also be such that they are not altered when subjected to the temperature and pressure of the formation for a period of time greater than the producing life of the formation. It thereby becomes unnecessary to replug portions of the formation to replace disintegrating or destroyed gel particles.

Examples of some of the gels and surfactants that are particularly desirable for waterflooding formations by this invention are as follows:

| Gels | Surfactants |
| --- | --- |
| Partially hydrolyzed polyacrylamids | Igepal CO–610 |

| | |
|---|---|
| gelled with polyvalent metal ions, such as iron | |
| Partially hydrolyzed polyacrylamids gelled with formaldehyde | Brij 30 |
| Lignosulfonate gelled with polyvalent metal ions of aluminum | Siponic L-4 |
| Carboxymethylcellulose gelled with polyvalent metal ions, such as aluminum | Triton N-57 |

The following is an example of one typical flooding operation utilizing this invention:

A flood water composed of 0.1 percent Igepal CO-610 and 0.1 volume percent gel particles comprised of 2,000 ppm partially hydrolyzed polyacrylamids and 400 ppm ferric chloride hexahydrate is injected into a conventional water-flood pattern. It is preferred that the formation not be previously water-flooded prior to this operation.

Other modifications and alterations of this invention will become apparent to those skilled in the art from the foregoing discussion and it should be understood that this invention is not to be unduly limited thereto.

What is claimed is:

1. A method for recovering hydrocarbons from a subterranean hydrocarbon-containing formation penetrated by at least one injection well and at least one remotely located producing well, comprising:

injecting downwardly through the injection well and into the formation a mixture of gel particles, flood water, and surfactant, said gel particles having a diameter larger than the diameter of the largest pores of the hydrocarbon-containing formation; and producing to the surface hydrocarbons entering the producing well from the hydrocarbon-containing formation.

2. A method, as set forth in claim 1, wherein the gel particles are selected from a group consisting of partially hydrolyzed polyacrylamids gelled with metal ions, partially hydrolyzed polyacrylamids gelled with formaldehyde, lignosulfonate gelled with polyvalent metal ions, or carboxymethylcellulose gelled with polyvalent metal ions.

3. A method, as set forth in claim 1, wherein the surfactant is selected from a group consisting of nonylphenoxy poly(ethyleneoxy) ethanol, polyoxyethylene (4) lauryl ether, polyoxyethylene (2) cetyl ether, ethoxylated lauryl alcohol, or nonylphenoxylpolyethoxy ethanol.

4. A method, as set forth in claim 1, wherein sufficient volumes of gel particles are intermittently injected into a stream of water and surfactant flowing downwardly through the injection well and into the hydrocarbon-containing formation.

5. A method, as set forth in claim 1, wherein the volume of gel particles injected into the formation is an amount sufficient to cause a change in the injectivity profile of the injection well.

6. A method, as set forth in claim 1, wherein the volume of gel particles injected into the formation is an amount sufficient to cause the injectivity profile of the injection well to be substantially uniform over portions of the formation.

7. A method, as set forth in claim 1, wherein the volume of gel particles is an amount sufficient to reduce the permeability of the hydrocarbon-containing formation without substantially completely plugging said formation.

8. A method, as set forth in claim 1, wherein the gel particles are of sufficiently low strength so as to shear on the porous spaces of the formation being plugged at a pressure below the fracturing pressure of the hydrocarbon-containing formation.

9. A method, as set forth in claim 1, wherein the formation plugging properties of the gel particles are not rendered ineffective by action of the temperature and pressure of the formation thereupon for a period of time greater than the producing life of the hydrocarbon-containing formation.

* * * * *